UNITED STATES PATENT OFFICE

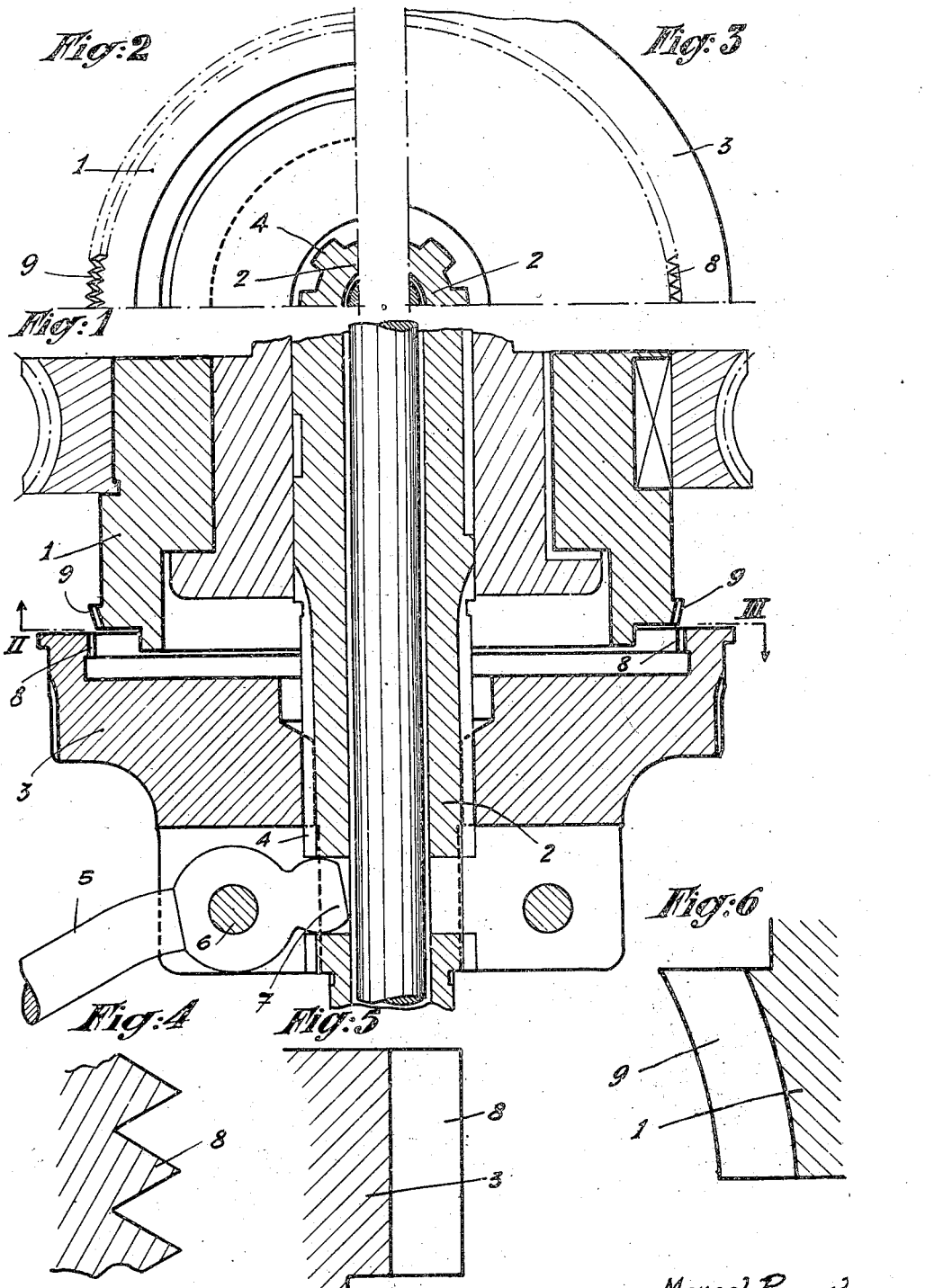

2,488,231

AXIALLY ENGAGING POSITIVE CLUTCH FOR MACHINE TOOLS

Marcel Pégard, Paris, France

Application December 4, 1945, Serial No. 632,632
In France October 5, 1943

Section 1, Public Law 690, August 8, 1946
Patent expires October 5, 1963

2 Claims. (Cl. 192—67)

Commonly used clutches generally comprise two concentric members one of which is axially movable with respect to the other. The members are provided on their front faces or their mutual peripheries with projections and recesses adapted to engage like toothings on the mating member.

When the projections and recesses are provided on the front faces, their structure compels to give them a predetermined breadth which should not be lessened; hence, a minimum pitch is imposed which requires a rotation by a fairly large angle to cause coupling. An improvement has already been made by constructing the clutch members as male and female spur-gears; thus the pitch and rotation angle have been reduced.

It is an object of my invention altogether to do away with the disadvantage above mentioned which is sometimes troublesome.

According to this invention, the male clutch member has a peripheral gear constituted by small serrations of triangular section which are inclined with respect to the axis of the clutch in order to avoid jamming in the female clutch member when uncoupling. The female clutch member bears the same number of likewise triangular serrations but the latter are machined to lie in parallel relationship with the axis.

The number of serrations may be very great with regard to the diameter. For instance, for a diameter of 95 mm., it is possible to provide 173 serrations corresponding to a rotation angle of about 2° 5′, and for a diameter of 165 mm., 245 grooves corresponding to a rotation angle of about 1° 26′. With such small angles, the member to be driven is quickly and accurately put in gear.

The following description with reference to the accompanying drawings given solely by way of example will show how this invention may be carried out.

Fig. 1 is an axial section of a clutch for operating the feed-mechanism of a drilling-machine, a boring machine or a milling machine.

Figs. 2 and 3 are partial sections taken along lines II and III on Fig. 1.

Fig. 4 is a partial cross-section of the female gear.

Figs. 5 and 6 are enlarged axial sections of the female and male gears.

As shown on Fig. 1, the clutch comprises a male crown 1 freely rotating on a sleeve 2 and a female disc 3 which is connected with said sleeve 2 by splines 4; crown 1 is adapted to be coupled with disc 3 upon actuation of a lever 5 pivoted on a transverse pin 6 fast with said disc 3, the inner end 7 of the lever engaging a corresponding recess in sleeve 2.

The female disc 3 has an inner gear consisting of a great number of small straight serrations 8 with a triangular section (Figs. 4 and 5). The male crown 1 is provided with a corresponding outer gear which, as best seen in Fig. 1, is frusto-conical in shape and comprises the same number of serrations 9 which have the same triangular section but which have arcuate concave outer edges as best understood from Fig. 6.

I do not intend to be limited to the precise details shown or described, as many modifications may be brought about in the above embodiment without departing from the spirit of this invention; besides my clutch may be applied to machines and mechanisms of any kind.

What I claim is:

1. In a clutch, in combination with a female clutch member having a peripherally serrated cylindrical recess the serrations of which have their inner edges in cylindrical formation and are of triangular cross section, a male clutch member adapted to be moved axially into and engage said serrated cylindrical recess for coupling purposes, said male clutch member being formed with a multiplicity of peripheral serrations in a generally frusto-conical ring formation, each serration having an arcuate concave outer edge and a triangular cross-section.

2. The combination according to claim 1, further characterized in that the curvature of the concavity of the outer edge of each serration of the male clutch member extends from end to end of said outer edge.

MARCEL PÉGARD.

REFERENCES CITED

The following references are of record in the file of this patent:

UNITED STATES PATENTS

| Number | Name | Date |
|---|---|---|
| 1,218,784 | Le Blond et al. | Mar. 13, 1917 |
| 1,558,074 | Bried | Oct. 20, 1925 |

FOREIGN PATENTS

| Number | Country | Date |
|---|---|---|
| 7,108 | Sweden | Sept. 16, 1895 |